(12) United States Patent
Clark

(10) Patent No.: US 7,714,473 B2
(45) Date of Patent: May 11, 2010

(54) ELECTRICAL MACHINES WITH REDUCED COGGING

(75) Inventor: Paul Eaton Clark, Rugby (GB)

(73) Assignee: Converteam Ltd., Warwickshire (GB)

( * ) Notice: Subject to any disclaimer, the term of this patent is extended or adjusted under 35 U.S.C. 154(b) by 267 days.

(21) Appl. No.: 11/787,724

(22) Filed: Apr. 17, 2007

(65) Prior Publication Data
US 2007/0252466 A1 Nov. 1, 2007

(30) Foreign Application Priority Data
Apr. 18, 2006 (GB) .................... 0607545.1

(51) Int. Cl.
*H02K 1/27* (2006.01)
(52) U.S. Cl. .................... 310/156.45
(58) Field of Classification Search ..............
310/156.45–156.49, 156.53, 156.56
See application file for complete search history.

(56) References Cited

U.S. PATENT DOCUMENTS

| | | | | |
|---|---|---|---|---|
| 4,933,584 A | * | 6/1990 | Harms et al. ............. | 310/162 |
| 5,610,464 A | * | 3/1997 | Asano et al. ............ | 310/156.45 |
| 6,222,288 B1 | | 4/2001 | Benito Izquierdo | |
| 7,034,424 B2 | * | 4/2006 | Kometani et al. ....... | 310/156.47 |
| 7,067,948 B2 | * | 6/2006 | Yamaguchi et al. ..... | 310/156.47 |
| 7,245,054 B1 | * | 7/2007 | Walls et al. ............. | 310/156.25 |
| 7,592,729 B2 | * | 9/2009 | Hahn ...................... | 310/156.48 |
| 2006/0103251 A1 | | 5/2006 | Taniguchi et al. | |

FOREIGN PATENT DOCUMENTS

| | | | |
|---|---|---|---|
| EP | 1 217 713 A3 | 8/2003 | |
| JP | 7-336976 | 12/1995 | |
| JP | 7336976 A | 12/1995 | |

* cited by examiner

*Primary Examiner*—Tran N Nguyen
(74) *Attorney, Agent, or Firm*—Kirschstein, et al.

(57) ABSTRACT

The present invention provides an electrical machine 1 with reduced cogging. The magnet poles 3 of the electrical machine are comprised of at least two separate groups of at least two circumferentially adjacent magnet poles. One of the circumferentially outer magnet poles 3 in one of the groups of magnet poles is defined as being in its reference position. The reference position of each other magnet pole 3 is defined as the position each other magnet pole would occupy if all the magnet poles were equally circumferentially spaced around the first or second body and the one circumferentially outer pole was in its reference position. At least one of the circumferentially outer magnet poles 3 in each group is sited in its reference position. At least one magnet pole 3 in each group is a displaced magnet pole and is sited in a position that is displaced from its reference position by an amount that is not equal to an integral multiple of the reference angular pitch of the winding slots. The displacement of the magnet poles 3 provides a pronounced reduction in cogging.

17 Claims, 5 Drawing Sheets

ELECTRICAL MACHINES WITH REDUCED COGGING

FIELD OF THE INVENTION

This invention relates to permanent-magnet based, alternating current, rotating electrical machines and the minimizing of cogging torque exhibited by such machines. In particular it relates to electrical machines with reduced cogging due to the displacement of their magnet poles.

BACKGROUND OF THE INVENTION

A common problem encountered in the operation of electrical machines is cogging. Cogging is the presence of non-linear magnetic torque during the operation of the machine due to the effect of the geometry of the rotor and the stator at the air gap on the flux distribution and the forces between the rotor and the stator. Specifically, it is caused by the rotor having preferred low potential energy positions relative to the stator, where the attraction between the rotor and stator is at a maximum, and corresponding high potential energy positions disposed between each of the low energy positions. It is the difference in potential energy between these positions that determines the magnitude of the cogging torque.

Cogging during the operation of electrical machines can result in decreased efficiency and reliability, as well as causing unwanted vibration and noise and, in extreme cases, complete failure. Cogging is well known in machines in which the stator, the rotor, or both the rotor and the stator exhibit some form of saliency. The effect is also well known in induction machines in which the magnet poles and winding slots interact to cause serious cogging for particular numbers of winding slots. Cogging is particularly pronounced in machines which have a number of winding slots that is an integral multiple of the number of magnet poles and where both the winding slots and magnet poles are uniformly spaced around the circumference of the bodies in which they are formed. This is because, due to the symmetry of such machines, when one magnet pole is in its lowest potential energy position relative to the winding slots, all the other magnet poles will also be in their lowest potential energy position and the rotor will therefore be in the lowest possible potential energy position relative to the stator.

Furthermore, this means if there are n winding slots the rotor will have n low potential energy positions relative to the stator and the cogging frequency during operation of the machine will be a product of the rotation frequency of the rotor and n.

Typical permanent-magnet based electrical machines are formed such that the rotor is rotatably mounted within the stator, the magnet poles are uniformly spaced around the circumference of the outer surface of the rotor and the winding slots are uniformly spaced around the circumference of the inner surface of the stator. However, other constructions are also possible. For example, it is possible that the rotor is rotatably mounted outside the stator. It is also possible for the magnet poles to be fixed to the stator and the winding slots to be formed in the rotor. With regards to cogging, the design considerations for permanent-magnet based electrical machines according to any of these constructions are substantially the same.

The factors that must be considered when deciding upon the number of winding slots in an electrical machine are generally well known. For example, it is known that when an electrical machine has a number of winding slots which is an integral multiple of the number of its magnet poles the magneto-motive force (m.m.f.) created by the machine's stator winding during operation will contain a minimized number of harmonics but the machine may also experience pronounced cogging during operation.

Numerous methods of minimizing cogging have been proposed and implemented with varying degrees of success. For some types of machine it is possible to minimise cogging by having a number of winding slots that is not an integral multiple of the number of magnet poles. Such windings are generally referred to as comprising 'fractional slots per pole per phase' and are well known to those who are skilled in the art. However, in some cases this may not be preferred, or even possible. For example, in large-scale electrical machines the options for having differing numbers of winding slots that are not multiples of the number of magnet poles are very limited as the non-synchronous flux patterns that result from such changes in the number of winding slots inevitably lead to additional losses in the magnet poles. These losses may be extremely high and even render the method unusable.

An alternative method of reducing cogging is to incorporate magnetic wedges in the winding slots but this method is costly. It is also possible to use 'semi-closed' winding slots to reduce cogging but for the types of winding that comprise formed coils and are common in large machines this type of winding slot can lead to an unacceptably high winding cost. Permanent-magnet machines that have magnet poles specifically shaped to reduce cogging have also been proposed. Typically, it is proposed that the outer surfaces of the magnet poles are formed such that the air gap between the stator and the magnet poles is not uniform.

Another method of minimising cogging torque in permanent-magnet based electrical machines is to have the magnets skewed from their conventional arrangement. For example, Japanese Patent 2005-261188 discloses a machine with reduced cogging in which the magnets are skewed such that they are not parallel with the axis of the machine.

A further method of minimising cogging torque is disclosed in U.S. Pat. No. 4,713,569. This Patent discloses an AC electric motor with a permanent-magnet rotor containing a plurality of magnet poles that are angularly displaced from their reference positions by an amount dependent upon the number of magnet poles and the number of stator poles (winding slots) in the machine. The reference positions of the magnet poles are the positions where they would be situated were they equally spaced circumferentially. Specifically, in electrical machines according to this Patent each magnet pole is displaced from its reference position by a different amount, the differing amounts all being integral multiples of 360° divided by the product of the number of stator poles (winding slots) and the number of magnet poles, such that no magnet pole is displaced from its reference position by more than the pitch of the stator poles (winding slots). The specific example given in the specification is of an AC electric motor with a permanent-magnet rotor with 8 magnet poles and a stator with 24 poles (winding slots) and wherein the magnet poles are displaced from their reference positions by integral multiples of 1.875° (360°/(24×8)) such that no two poles are displaced from their reference positions by the same amount and the (nominal) $8^{th}$ magnet pole is displaced from its reference position by an amount equal to the stator pole (winding slot) pitch.

The rotor construction disclosed in U.S. Pat. No. 4,713,569 provides a substantial reduction in cogging torque as compared to conventional electrical machines with uniformly spaced magnet poles. However, in most cases this rotor construction will not be preferred to the conventional construction due to its impact on other design considerations. For example, this construction results in complete asymmetry of the positioning of the magnet poles around the rotor. If the electrical machine is intended for high-speed use this asymmetry is undesirable as it means the magnet pole arrangement is not mechanically balanced. This complete asymmetry also results in a pronounced harmonic content of either the m.m.f. created by the stator winding if the machine is a motor or the electromotive force (e.m.f.) waveform created in the stator winding if the machine is a generator.

The rotor construction of U.S. Pat. No. 4,713,569 may also not be preferred due to the separation of the first and last magnet poles as defined in that Patent. This is because the angular separation between these two magnet poles is significantly less than in a conventional electrical machine with uniformly spaced magnet poles. Specifically, the separation between these two poles is less than the uniform spacing by an amount equal to the winding slot pitch. Depending upon the angular width of the magnets that form these magnet poles, this could lead to the two magnet poles being in contact with or impinging upon one another, which is generally undesirable, as discussed later.

Finally, the strict requirement for the positioning of the magnet poles also leads to a lack of flexibility in the design of machines according to U.S. Pat. No. 4,713,569. That is, the positions of the magnet poles can not be altered in response to any other design consideration.

SUMMARY OF THE INVENTION

The present invention provides an electrical machine including a first body having one of a plurality of circumferentially spaced winding slots and a plurality of circumferentially spaced magnet poles formed at its radially inner surface, and a second body that is located within the first body and having the other of the plurality of circumferentially spaced winding slots and the plurality of circumferentially spaced permanent-magnet poles formed at its radially outer surface; one of the first body and the second body being a rotor and rotatably mounted and the other of the first body and the second body being a stator and being fixedly mounted; the winding slots having a reference angular pitch that is equal to 360° divided by the number of winding slots in the electrical machine; the magnet poles including at least two separate groups, each group including at least two circumferentially adjacent magnet poles; each magnet pole having a reference position wherein the reference positions are equally spaced around the circumference of the body at which the magnet poles are formed; at least one of the circumferentially outer magnet poles in each group being located in its reference position, and at least one magnet pole in each group being a displaced magnet pole and being located in a position that is displaced from its reference position by an amount that is not equal to an integral multiple of the reference angular pitch of the winding slots.

The magnet poles can be formed on the stator and the winding slots can be formed in the rotor. However, it is generally preferred that the magnet poles are formed on the rotor and the winding slots are formed in the stator. For ease of comprehension, the following discussion of the issues relating to electrical machines according to this invention refers to electrical machines that have this second arrangement. However, it is to be understood that electrical machines according to this invention may also be constructed in the first arrangement and the following discussion applies equally to both arrangements unless otherwise specified.

It is envisaged that it will generally be preferred that electrical machines according to this invention will be constructed such that the first body is the stator and the second body is the rotor. That is, that the rotor is rotatably mounted within the stator. However, it is to be understood that electrical machines according to this invention wherein the rotor is the first body and is rotatably mounted outside the second body, which is the stator, are equally possible and may even be preferred for some applications. The following discussion applies equally to either configuration, unless otherwise specified.

The definition of the number of magnet poles in each magnet pole group and whether an individual magnet pole is a displaced pole or a circumferentially outer pole that is in its reference position may be somewhat arbitrary. In some embodiments of the invention the number of magnet poles contained in each group of magnet poles may be immediately apparent, for example if each group of magnet poles contains the same number of magnet poles and the magnet poles in each group are displaced in the same pattern. If the number of magnet poles in each group is apparent then by arbitrarily defining any individual magnet pole as a circumferentially outer magnet pole that is in its reference position then, as a consequence of that definition, the nature of all the other magnet poles will be defined automatically. For example, if there are eight magnet poles within each group and each group has an identical displacement pattern then, by defining any single magnet pole as a circumferentially outer magnet pole that is in its reference position, the nature of all the other magnet poles will also be defined depending on their positions relative to that magnet pole.

Furthermore, as stated above, each electrical machine according to this invention has a number of magnet poles that are displaced and may also have a number of magnet poles that are not displaced and are not circumferentially outer magnet poles. These 'undisplaced' magnet poles are sited in their reference positions. The definition of the reference position of each magnet pole is also fairly arbitrary but it does help the understanding of the design of electrical machines according to this invention. The reference position of each magnet pole can be further understood in the following manner. The design of any electrical machine according to this invention can be considered to be formed by taking the design of the rotor of a conventional electrical machine that has the magnet poles equally spaced around its circumference and circumferentially displacing some of the magnet poles. The position each magnet pole would have occupied in that conventional electrical machine is its reference position. That is, the reference positions for an electrical machine according to this invention are equally spaced around the circumference of the body in which the magnet poles are formed. The magnet poles that do not occupy their reference positions are the displaced magnet poles. In this manner the displaced magnet poles, the magnet pole groups and the reference position of each magnet pole may be defined simply.

The pitch of any object is defined as the angular or linear circumferential separation of the equivalent points on two adjacent circumferentially spaced objects. Therefore the winding slot pitch is defined as the circumferential separation between the equivalent points on two adjacent winding slots. If an electrical machine has radially symmetrical winding slots the linear winding slot pitch may be defined as the circumferential separation between the slot centre-lines of two adjacent winding slots as measured around the surface of the body in which they are formed. The winding slot pitch may also be expressed as an angle which, if expressed in radians, is equal to the linear winding slot pitch divided by the radius of the body in which the slots are formed. The reference angular pitch of the winding slots, when expressed in degrees, is equal to 360° divided by the number of winding slots contained in the machine and, when expressed in radians, is equal to 2π divided by the number of winding slots.

The winding slots will preferably each be identical and be uniformly spaced. That is, their actual pitch will be equal to their reference pitch. However, electrical machines that have winding slots that are non-identical and/or that are not uniformly spaced are also possible. The presence of non-uniformly spaced winding slots would affect the operation and behaviour of electrical machines according to this invention in substantially the same manner as for conventional electrical machines, as would be apparent to a person skilled in the art. As the positioning of the winding slots affects the operation of machines according to this invention this needs to be considered along with the other design considerations described in this specification when defining the displacement pattern of the magnet poles in an electrical machine according to this invention.

Electrical machines according to this invention will generally have a number of winding slots that is an integral multiple of the number of magnet poles. However, for some machines according to this invention it may be possible to reduce cogging further by having a number of winding slots that is not an integral multiple of the number of magnet poles, i.e. a 'fractional slots per pole per phase' winding. However, generally such designs will not be preferred, or even possible as the non-synchronous flux patterns that result from 'fractional slots per pole per phase' windings inevitably lead to additional losses in the magnet poles, as discussed earlier.

The reference angular pitch of the magnet poles is defined as 360° divided by the number of magnet poles in the machine.

The presence of displaced magnet poles in machines according to this invention leads to a reduction in cogging due to its effect on the potential energy of the relative positions of the rotor relative to the stator. Specifically, displacing the magnet poles reduces the magnitude of the potential energy difference between the rotor's highest and lowest potential energy positions relative to the stator. This is because when the magnet poles are not uniformly spaced around the circumference of the rotor, when any one individual magnet pole is in its lowest possible potential energy position relative to the winding slots any other magnet pole that is displaced from its reference position relative to that individual magnet pole by an amount that is not an integral multiple of the winding slot pitch will be in a higher potential energy position relative to the winding slots. This means that the overall potential energy of the rotor in that position will be raised compared to the equivalent position of a rotor which has magnet poles uniformly spaced at integral multiples of the winding slot pitch. An equivalent argument applies to the high energy positions of the rotor. That is, the presence of displaced magnet poles lowers the energy of the high potential energy positions of the rotor relative to the stator.

The raising of the energy of the low potential energy positions and the lowering of the energy of the high potential energy positions of the rotor relative to the stator results in a reduction in the cogging torque. The magnitude of the reduction in cogging torque depends on the specific displacement pattern of the magnet poles that is used in any machine but it can be very pronounced. The displacement of the magnet poles also results in an increase in cogging frequency as the displacement of some of the magnet poles results in an increase in the number of low and high potential energy positions of the rotor relative to the stator.

The effectiveness of the displacement of the magnet poles in reducing cogging is also influenced by a number of additional factors which must also be considered. Such factors include the width of each magnet pole relative to the winding slot pitch and the ratio of the winding slot opening to the winding slot pitch. These parameters influence the alignment of the m.m.f. pattern of the magnet poles with the permeance variations caused by the winding slots which, in turn, affects the magnitude of the energy of the low and high potential energy positions There are many shapes of winding slots that are commonly used and whose effects will be well known to a person skilled in the art.

Although, theoretically, the minimum possible cogging torque is achieved if each magnet pole is displaced by less than the winding slot pitch and by a different amount, as in an electrical machine according to U.S. Pat. No. 4,713,569, for the reasons discussed earlier, this pattern is not usually preferred. The displacement of the magnet poles as defined herein is generally preferable as it may enable the stator or rotor to be constructed more easily and furthermore, displacement patterns according to the present application may be sufficiently simple to enable the behaviour of the machine to be modelled and analysed easily. If the displacement of the magnet poles around the rotor or the stator is too complex, computer analysis of the behaviour of the machine during operation, though possible in principle, may become excessively difficult. If the behaviour of a machine cannot be analysed easily, it is difficult to modify the design in response to other considerations, such as voltage waveform harmonics.

If an electrical machine according to this invention is intended for high-speed use, it is preferable that the magnet pole arrangement does not result in the rotor being mechanically unbalanced. This can be ensured by having the magnets that form the magnet poles displaced around the rotor in a pattern that has at least two-fold rotational symmetry about its axis. One way of achieving this symmetry is to have a rotor with the same number of magnet poles in each group and the same displacement pattern of magnet poles within each group, as disclosed in the displacement patterns below.

Rotors with rotationally symmetrical displacement patterns of magnet poles are also preferred as they are generally relatively simple to construct. Furthermore, displacing the magnet poles in a rotationally symmetrical manner allows other design considerations, such as the predictability of behaviour and the minimisation of harmonic generation, to be satisfied whilst also allowing a significant reduction in the level of cogging to be achieved. The importance of these other design considerations means the rotationally symmetrical displacement of the magnet poles is often preferred when mechanical balance is not an important issue in the design of an electrical machine according to this invention, for example in large low-speed machines The displacement of the magnet poles in an electrical machine affects not only the cogging torque but also a number of other design considerations. Therefore the selection of a displacement pattern of the magnet poles for any electrical machine according to this invention will generally require a compromise between the reduction in the cogging torque and these other design considerations. Examples of such considerations are the harmonic content of the e.m.f. waveform created in the stator winding if the machine is a generator, the harmonic content of the m.m.f. created by the stator winding if the machine is a motor and the cost and complexity of the construction of the machine.

As an example of such design considerations, the following discussion refers to the issues affecting the e.m.f. waveform created in the winding of a generator.

When the magnet poles and the winding slots of a generator are uniformly spaced, as in a conventional generator, the circumferential m.m.f. force pattern created by the rotor during the operation of the generator contains only the fundamental magnet pole number frequency and its odd harmonics. However, if the winding slots are uniformly spaced and the magnet poles are not, as is possible in machines according to this invention, other frequencies will also be present. This can cause an excessive distortion of the voltage waveform in the stator winding arising from sub-harmonic frequencies and multiples thereof. However, as discussed below, it is possible that the stator winding phases in electrical machines according to this invention may be connected such that a substantial portion of the unwanted frequencies are eliminated or minimised.

The stator winding phases in an electrical machine may be connected in one, or more, parallel circuits in which the coils are connected so as to minimise the harmonic content of the e.m.f. waveform generated in the stator winding. For example, if the selected displacement pattern of the magnet poles of a generator according to this invention is such that there is a plurality of groups of magnet poles that each contain the same number of magnet poles and each have the same displacement pattern then it is preferred that the stator winding phases are connected such that the number of winding pole groups in series in each circuit is equal to, or is a multiple of, the number of magnet poles in each group of magnet poles. This connection of the stator winding phases ensures that the e.m.f. waveform created in the stator winding contains only the fundamental pole number frequency and its integral harmonics.

Furthermore, as the displaced magnet poles may lead to even harmonics in their m.m.f. pattern, the use of 100% pitched stator coils, that is, coils that have their two sides in winding slots which are separated by the reference angular pitch of the magnet poles, may be preferred as they ensure that the e.m.f. waveform created in the stator winding does not contain even harmonics of the fundamental pole number frequency.

The use of a star-connected 3-phase stator winding would ensure that the $3^{rd}$ harmonic of the fundamental pole number frequency and its integral multiples (triple-n harmonics) could not flow in the stator current and that a generator with a stator winding connected in this way would not have triple-n harmonics in its line-line voltage waveform. This specific winding is given as an example only. The effect on the e.m.f. harmonics of different winding configurations and windings with different numbers of phases is well known and would be readily understood by those who are skilled in the art.

Alternatively, pitching the stator coils at two-thirds of the reference angular pitch of the magnet poles would also eliminate the generation of triple-n harmonics in the stator e.m.f. as would certain forms of interleaved (or interspersed) windings, details of which are available in "Alternating Current Machines" by M. G. Say and would be well known to a person skilled in the art. However, having stator coils pitched at two-thirds of the reference angular pitch of the magnet poles in this way leads to a significant reduction in the rated power of the machine and the forms of interleaved windings that eliminate the triple-n harmonics are usually impractical for application in large scale machines with a high number of magnet poles.

In this way a generator according to this invention that has a displacement pattern of the magnet poles such that there is a plurality of groups of magnet poles each group containing the same number of magnet poles and the same displacement pattern and that has 100% pitched stator coils, a star connected 3-phase stator winding and stator coils that are connected such that the number of winding pole groups in series in each circuit is equal to, or is a multiple of, the number of magnet poles in each group of magnet poles, would create an e.m.f. waveform in the stator winding that contains only the fundamental pole number frequency, and its $5^{th}$, $7^{th}$, $11^{th}$, $13^{th}$ etc. harmonics when operated.

It is to be understood that the above discussion of the number and connection of the stator winding phases and the pitching of the stator coils to control the harmonics in the e.m.f. waveform created in the stator windings is not intended to be exhaustive and is included only as an example of the considerations involved in the specific design of a generator according to this invention. The methods of connecting the stator winding phases and pitching of stator coils in order to minimise unwanted harmonics in the e.m.f. waveform created in the stator winding of a generator are well known and could readily be applied to this invention by a person skilled in the art. Furthermore, it is also to be understood that, although the above section discusses the minimisation of undesirable harmonics in the e.m.f. waveform created in the stator winding of a generator according to this the invention, the design considerations for the minimisation of undesirable m.m.f. harmonics created by the stator winding in a motor according to this invention are exactly equivalent. A person skilled in the art would immediately be able to apply the methods discussed above to a motor according to this invention in order to minimise the undesirable m.m.f. harmonics in an analogous manner.

Furthermore, despite the possibility of elimination of a substantial portion of the unwanted harmonic content of the e.m.f. waveform created in generators according to this invention and the m.m.f. created by motors according to this invention using the above methods, it may still be necessary to select a magnet pole displacement pattern that results in a cogging torque greater than the minimum possible in order to achieve an acceptable harmonic content. At present this is possible because an acceptable reduction in cogging can be achieved by the relatively simple displacement patterns of magnet poles disclosed below. These patterns do not reduce the cogging torque to the absolute minimum possible but provide a significant reduction in the cogging torque whilst also being acceptable with respect to other design considerations. However, it is to be appreciated that, in some cases, it may be required to reduce the level of cogging further and then other displacement patterns may be preferred. For example, displacement patterns that contain larger groups of poles or have groups containing different numbers of poles may be preferable and these arrangements are equally possible according to this invention.

One set of preferred embodiments of a rotor according to this invention has a plurality of magnet pole groups, each group including eight magnet poles and having, the same displacement pattern. This displacement pattern provides a relatively simple construction of a rotor, a significant reduction in cogging and is preferably used in conjunction with a stator winding with parallel circuits of eight poles or multiples thereof. A preferred displacement pattern for each magnet pole group contained in the rotor formed in this manner is as follows:

| | Magnet pole no. within each group | | | | | | | |
|---|---|---|---|---|---|---|---|---|
| | 1 | 2 | 3 | 4 | 5 | 6 | 7 | 8 |
| Clockwise displacement from reference position (reference angular winding slot pitches) | 0 | ¼ | ½ | ¾ | ¾ | ½ | ¼ | 0 |

A rotor with its magnet poles displaced according to this pattern will have one quarter of its magnet poles that are not displaced and are situated in their reference positions. Three quarters of the magnet poles will be displaced magnet poles and of these one quarter will be displaced from their reference position by ¼ of the reference angular winding slot pitch (i.e. the reference angular pitch of the winding slots), one quarter will be displaced by ½ of the reference angular winding slot pitch and the final quarter will be displaced by ¾ of the reference angular winding slot pitch. Therefore this displacement pattern increases the number of preferred low potential energy positions between the rotor and the stator by a factor of four as compared to a machine with magnet poles spaced uniformly around the circumference. This results in a four-fold increase in the cogging frequency. However, more importantly, this displacement pattern also results in a significant reduction in the difference in the magnitudes of the attraction between the rotor and the stator when the rotor is in its low and high potential energy positions relative to the stator. This leads to a substantial and significant reduction in the magnitude of the cogging torque when a machine according to this invention with its magnet poles displaced according to the above pattern is operated.

Finite element analysis of this displacement pattern has shown that it is particularly effective in electrical machines that contain uniformly spaced winding slots, three winding slots for each magnet pole, have magnet poles that are ¾ of the width of the reference angular magnet pole pitch (i.e. the reference angular pitch of the magnet poles) and have winding slot openings that have a circumferential width that is ½ of the reference angular winding slot pitch.

This displacement pattern can be understood as each magnet pole being displaced from its nominal reference position in the same direction by an amount according to the following formula:

$$D = \frac{2(p-1)}{N}$$

Where:

D=the angular displacement (in winding slot pitches) of the magnet pole p from its reference position;

N=the number of magnet poles in the group; and p=the magnet pole number within the group, counted from the closest adjacent magnet pole group.

Figure 1:
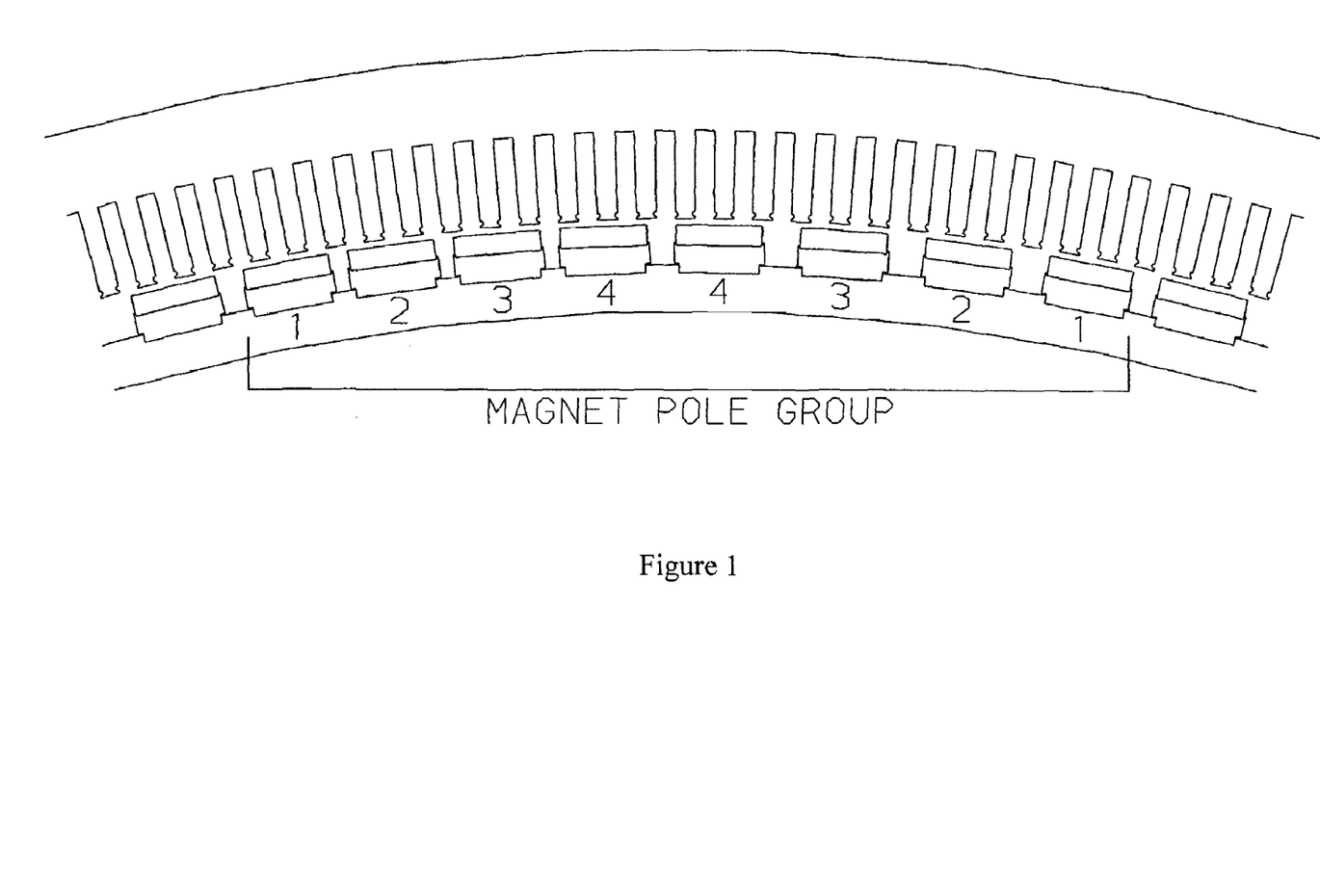
FIG. 1 shows the value of p for each magnet pole in a group of eight magnet poles.

(The values of p for a group of eight magnet poles can be understood with reference to FIG. 1, which shows the p value for each magnet pole in a group of eight magnet poles in a machine according to this invention.)

This formula can be applied to any group of magnet poles that contains at least four magnet poles. It provides a displacement pattern consisting of a progressive increase in the angular displacement of the poles around each group, followed by an equivalent progressive decrease back to zero. A progressive increase in angular separation followed by an equivalent progressive decrease is preferred as it may ensure adequate separation of the magnet poles if combined with an appropriate choice of magnet pole width.

The required angular separation between adjacent magnet poles depends on the specific design of each electrical machine. Generally, the required separation is primarily determined by the need to control the magnitude of flux leakage between adjacent poles. That is, in order to keep flux leakage between adjacent poles within acceptable design parameters it is usually preferable that adjacent magnet poles are substantially separated. However, it is to be understood that it is possible to construct electrical machines according to this invention which contain pairs of adjacent magnet poles that are in contact with, or close proximity to, one another.

The fixings used to attach the magnet poles to the rotor surface may also affect their angular spacing and hence the selection of the displacement pattern of the magnet poles.

As the minimum separation of the magnet poles according to this invention is determined by the above considerations, these considerations also help determine the maximum displacement of any individual magnet pole from its reference position. Although the above displacement pattern, as defined by the above equation, requires that no magnet pole is displaced by more than the reference angular winding slot pitch it is to be understood that displacement patterns containing magnet poles displaced by more than this amount are possible as long as the minimum desired angular separation of the magnet poles is maintained. For example, in machines according to this invention by having a displacement pattern of magnet poles that contains groups of twelve or more magnet poles it is possible to have magnet poles displaced by more than the reference angular winding slot pitch without reducing the minimum spacing between any two adjacent magnet poles by less than one quarter of the reference angular winding slot pitch, as shown in the displacement pattern below.

| | Magnet pole no within each group | | | | | |
| --- | --- | --- | --- | --- | --- | --- |
| | 1 | 2 | 3 | 4 | 5 | 6 |
| Clockwise displacement from reference position (angular winding slot pitches) | 0 | ¼ | ½ | ¾ | 1 | 5/4 |

| | Magnet pole no within each group | | | | | |
| --- | --- | --- | --- | --- | --- | --- |
| | 7 | 8 | 9 | 10 | 11 | 12 |
| Clockwise displacement from reference position (angular winding slot pitches) | 5/4 | 1 | ¾ | ½ | ¼ | 0 |

Alternatively, groups of magnet poles containing other than eight magnet poles and displaced according to the formula above may be utilised in order to satisfy the design considerations of specific embodiments of electrical machines according to this invention, as discussed earlier. For example, it may be necessary to have ten poles in each parallel path in the stator winding in order to have a satisfactory coil configuration. In this case the magnetic pole pattern or displacement pattern might be:

|  | Magnet pole no. within each group | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Clockwise displacement from reference position (angular winding slot pitches) | 0 | 1/5 | 2/5 | 3/5 | 4/5 | 4/5 | 3/5 | 2/5+12 | 1/5 | 0 |

However, it is to be understood that displacement patterns other than those defined above are possible. Specifically, other displacement patterns in accordance with this invention that also satisfy the coil configuration requirements are also possible. Furthermore, it is also to be understood that the displacement patterns described above are only given as examples and are not intended to be limiting. An almost unlimited number of displacement patterns are possible and although these are not explicitly considered in this specification they may each be equally possible in the construction of electrical machines according to this invention.

The effectiveness of any displacement pattern of magnet poles will be dependent on the specific construction and operation of the specific electrical machine in which it is incorporated. It is intended that the preferred displacement pattern for any given machine may be found using conventional techniques that are well known to people skilled in the art, for example finite element techniques. However, due to the design considerations discussed above it is currently envisaged that it will be generally preferable that machines according to this invention have groups of magnet poles that each contain the same number of magnet poles and have the same displacement pattern of magnet poles within the group and that the number of winding pole groups connected in each parallel path is either equal to or is an integral multiple of the number of magnet poles in each group.

An electrical machine according to this invention may also incorporate other features that reduce cogging. For example, the magnet poles may be skewed such that they are not parallel to the axis of the rotor or the magnet poles may be shaped to reduce cogging.

Machines according to this invention may be either generators or motors and they may be used for a variety of purposes. One preferred embodiment of the invention is a low-speed large-diameter electric generator with one hundred and twelve magnet poles and three hundred and thirty-six winding slots as described below.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 2:
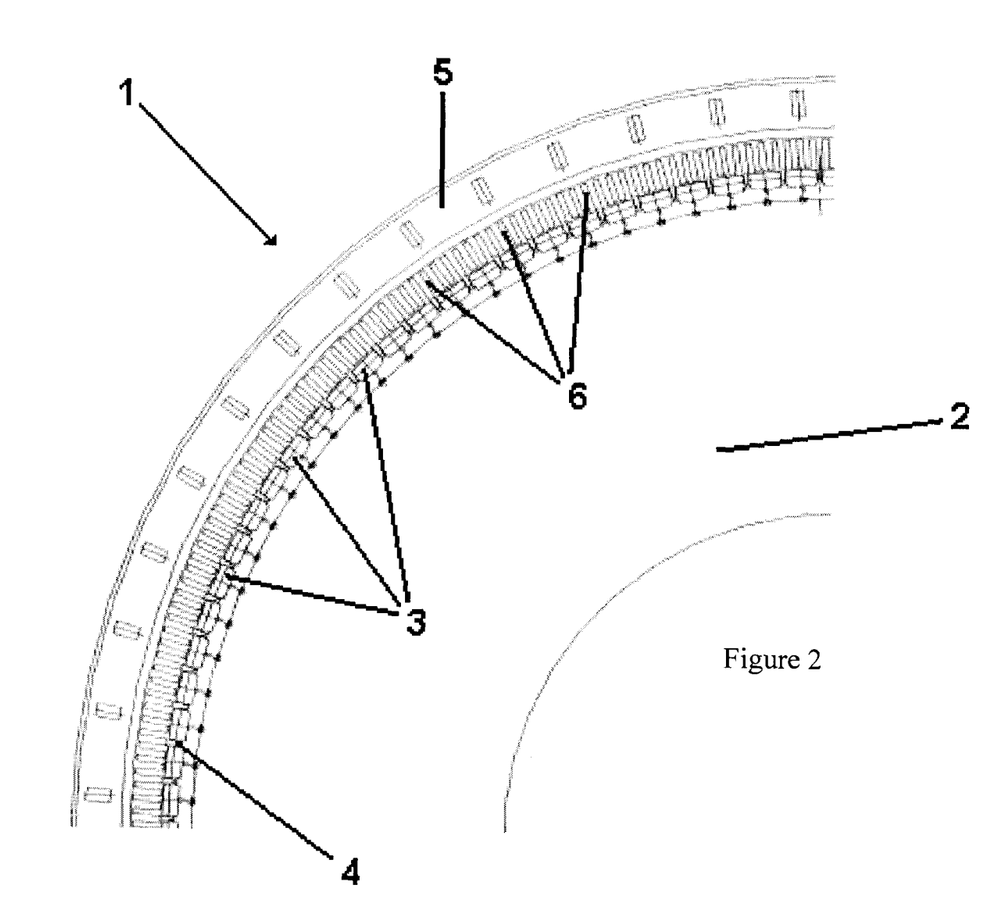
FIG. 2 is a partial cross-section of a low speed large diameter electrical generator of conventional construction.
Figure 3:
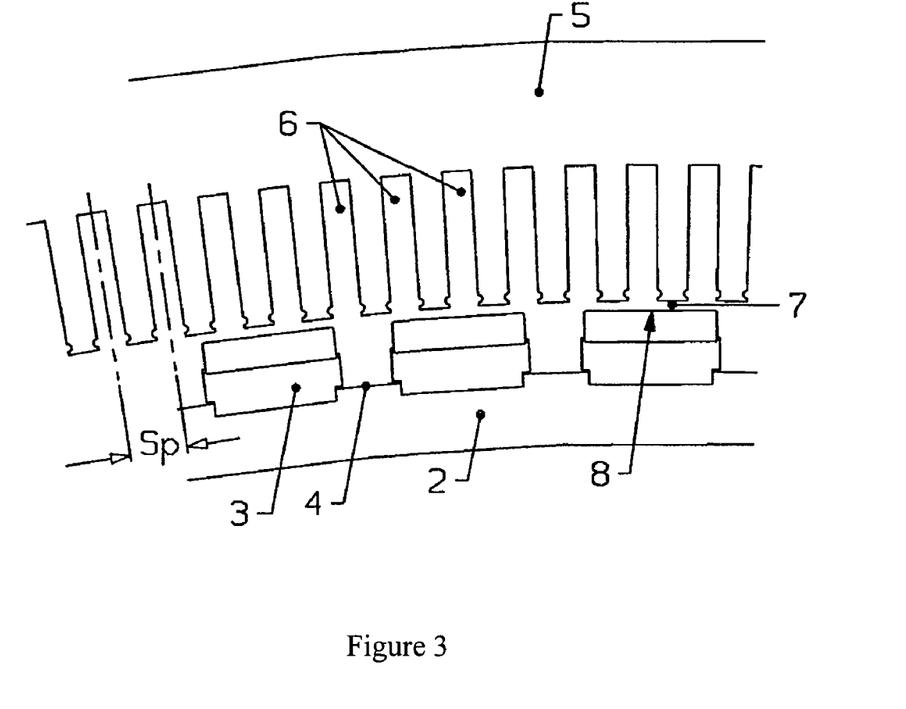
FIG. 3 is a close-up view of a section of FIG. 2.

A typical conventional construction of a low-speed large-diameter electrical generator 1 is shown in FIGS. 2 and 3. The rotor 2 has one hundred and twelve magnet poles 3 mounted around its outer rim 4. The magnet poles 3 are equally spaced from each other such that they are equally spaced around the circumference of the rim 4. That is, the magnet poles 3 are each positioned in their reference positions and the reference angular magnet pole pitch is 3.21° (360°/112). The rotor 2 is rotatably mounted within a stator 5 and there is an air gap 7 formed between the inner surface of the stator 5 and the outer surface 8 of the magnet poles 3. The stator 5 contains three hundred and thirty-six equally spaced winding slots 6 formed in its inner surface i.e. three winding slots per magnet pole. This equates to a reference angular winding slot pitch Sp of 1.07°, a third of the magnet pole pitch. Each winding slot 6 contains a portion of a stator winding (not shown) and the winding slots are also equally spaced around the circumference of the inner surface of the stator 5. As can be seen in FIG. 3, the winding slots 6 are approximately half the width of the winding slot pitch Sp and the magnet poles 3 are approximately four fifths of the width of the magnet pole pitch.

Figure 4:
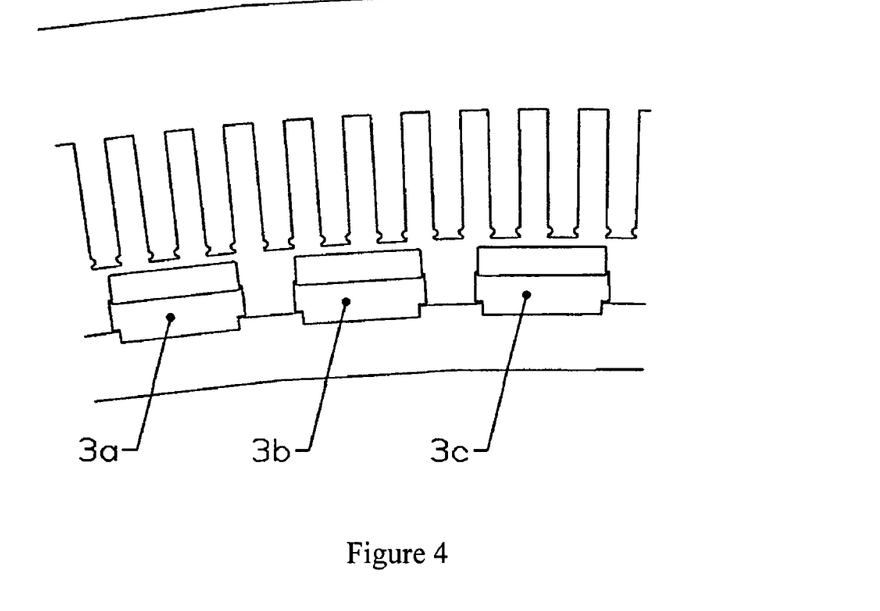
FIG. 4 is a partial cross-section of a low speed large diameter electrical generator according to a first aspect of this invention that is of substantially the same construction as the conventional generator shown in FIGS. 1 and 2.
Figure 5:
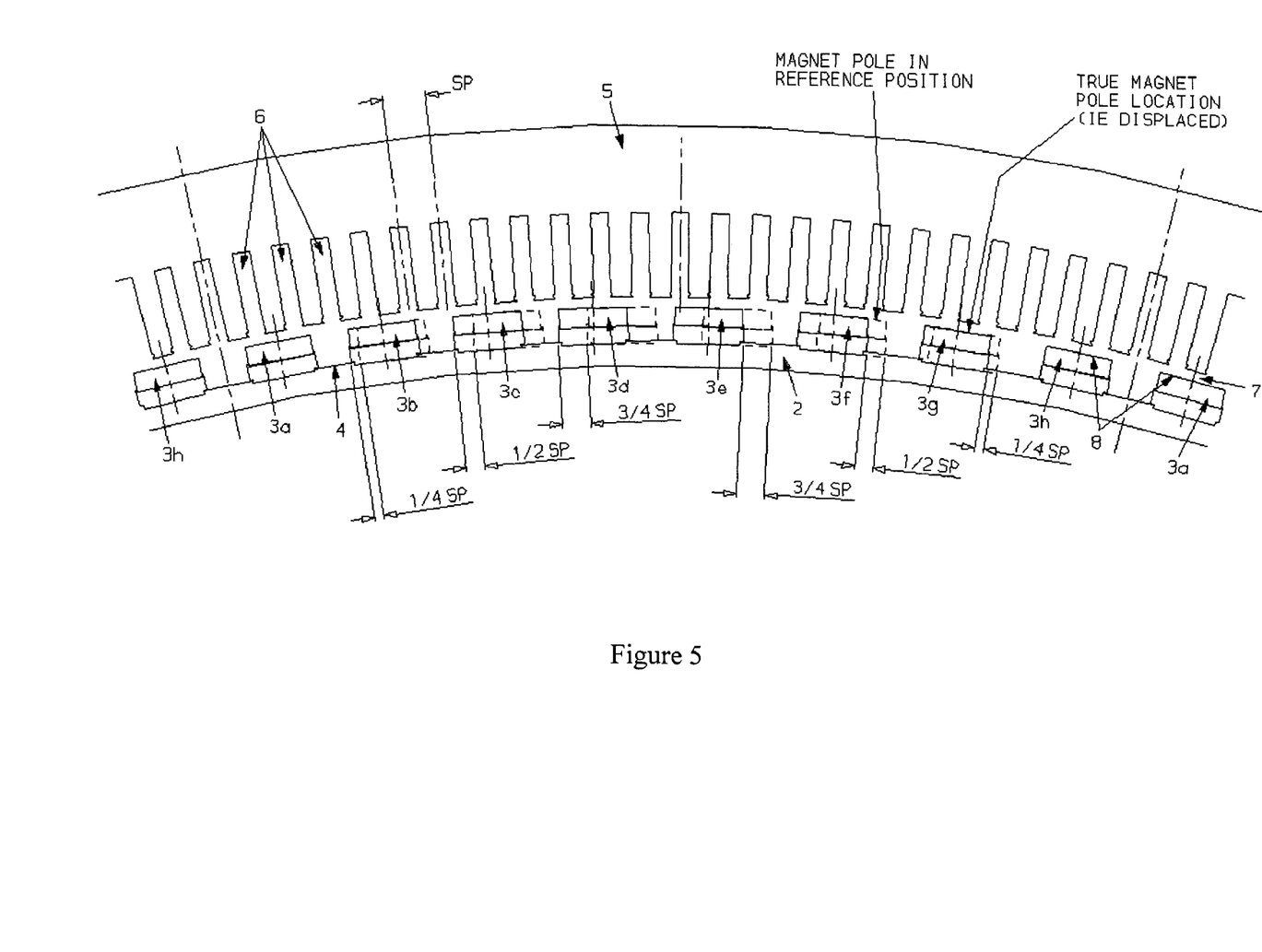
FIG. 5 is a schematic of a section of the generator of FIG. 4.

As can be seen in FIGS. 4 and 5, a low-speed large-diameter electrical generator according to this invention is of substantially identical construction to the conventional generator shown in FIGS. 2 and 3, except that the magnet poles have an angular width that is approximately equal to 2.25 winding slot pitches and some of the magnet poles 3 are displaced and are not in their reference positions. Specifically, the one hundred and twelve magnet poles 3 are positioned in fourteen identical groups of eight magnet poles and each magnet pole 3 within each group is angularly displaced in the clockwise direction from its reference position by an amount according to the formula:

$$D = \frac{2(p-1)}{N}$$

Where:
D=the angular displacement (in winding slot pitches) of the magnet pole p from its reference position;
N=the number of magnet poles in the group; and
p=the magnet pole number within the group, counted from the closest adjacent magnet pole group.

Pole 3a is the first pole in its group and is therefore positioned in its reference position. That is, D=0 as N=8 and p=1. Pole 3b is the second pole in the group (N =8 and p=2) and pole 3c (N=8 and p=3) is the third therefore they are displaced from their reference positions by one quarter of the winding slot pitch Sp and one half of the winding slot pitch Sp, respectively.

A complete group of magnet poles 3 of an electrical machine according to this invention are represented in FIG. 5. The two end poles 3a, 3h are positioned in their reference positions whilst the middle six poles 3b to 3g are displaced to the right of their reference positions by varying amounts. Poles 3b and 3g are displaced by one quarter of the winding slot pitch Sp, poles 3c and 3f by one half of the winding slot pitch Sp and poles 3d and 3e by three quarters of the winding slot pitch Sp.

Figure 6:
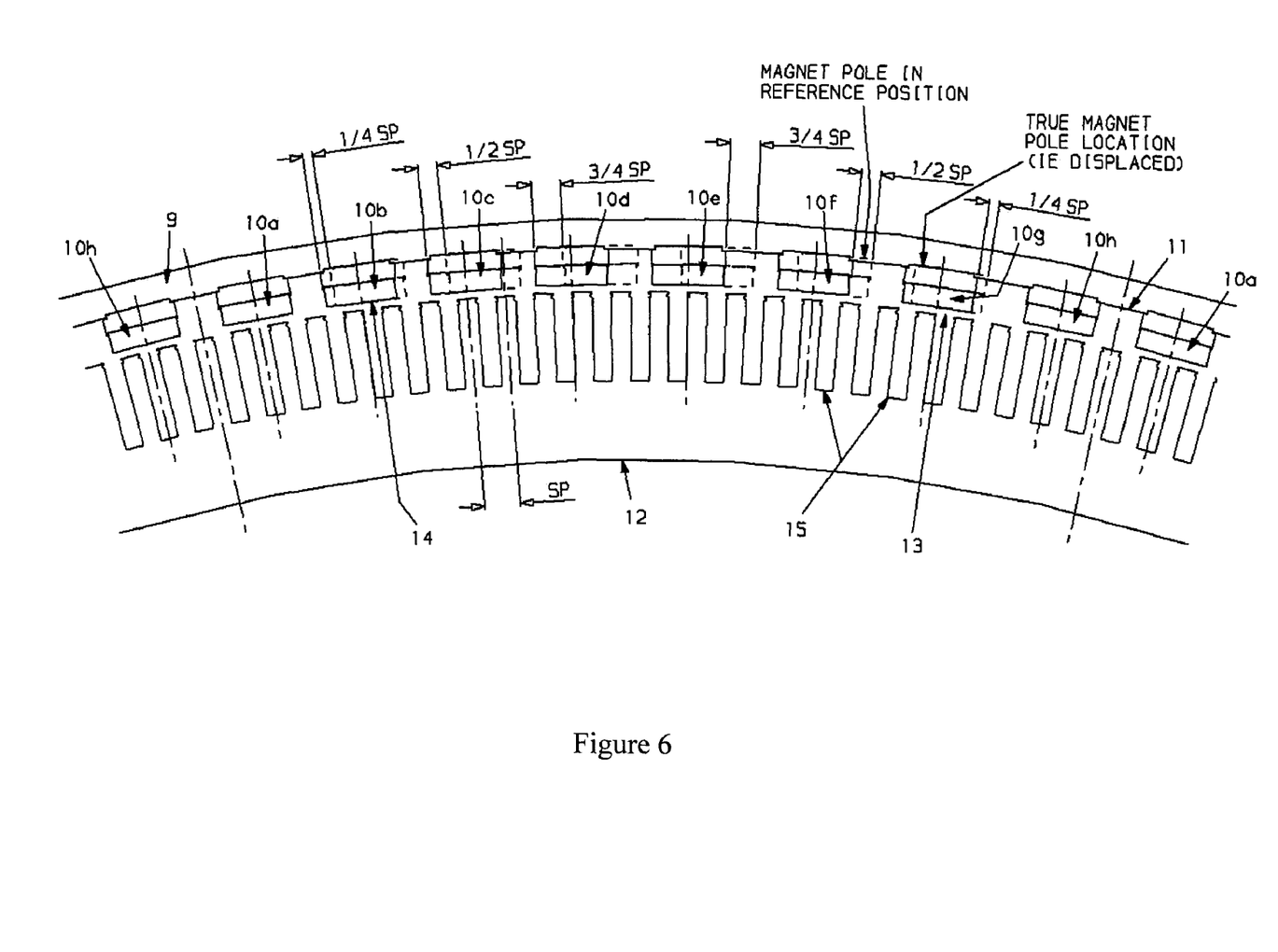
FIG. 6 is a schematic of a section of a low speed large diameter electrical generator according to a second aspect of this invention where the rotor is located radially outside the stator.

A low-speed large-diameter electrical machine having an alternative configuration is shown in FIG. 6. The rotor 9 has magnet poles 10a -h mounted around its inner rim 11. The rotor 9 is rotatably mounted around a stator 12 and there is an air gap 13 formed between the outer surface of the stator 12 and the outer surface 14 of the magnet poles 10. The stator 12 contains winding slots 15 formed in its outer surface. Each winding slot 15 contains a portion of a stator winding (not shown) and the winding slots are equally spaced around the circumference of the inner surface of the stator 12.

Pole 10a is the first pole in its group and is therefore positioned in its reference position. Pole 10b is the second pole in its group and is displaced to the right of its reference position by one quarter of the winding slot pitch Sp. Pole 10c is the third pole in its group and is displaced to the right of its reference position by one half of the winding slot pitch Sp. Pole 10d is the fourth pole in its group and is displaced to the right of its reference position by three quarters of the winding slot pitch Sp. Pole 10e is the fourth pole in its group when counted from the closest adjacent magnet pole group and is displaced to the right of its reference position by three quarters of the winding slot pitch Sp. Pole 10f is the third pole in its group and is displaced to the right of its reference position by one half of the winding slot pitch Sp. Pole 10g is the second pole in its group and is displaced to the right of its reference position by one quarter of the winding slot pitch Sp. Pole 10h is the first pole in its group and is positioned in its reference position.

It will be appreciated that none of the magnet poles are displaced from their reference position by an integral multiple of the winding slot pitch Sp.

For improved clarity, each of the poles 10a-10h is shown ghosted as it would appear if located at its respective reference position so that the displacement of each pole from that reference position can be easily identified.

What is claimed is:

1. An electrical machine including a first body having a plurality of circumferentially spaced winding slots formed at its radially inner surface, and a second body located within the first body and having a plurality of circumferentially spaced magnet poles formed at its radially outer surface, one of the first and the second bodies being a rotatably mounted rotor, and the other of the first and the second bodies being a fixedly mounted stator, the winding slots having a reference angular pitch that is equal to 360° divided by a number of the winding slots in the electrical machine;

the magnet poles comprising at least a first group including at least four circumferentially adjacent magnet poles, and a second group including at least four circumferentially adjacent magnet poles, the first group and the second group including a same number of magnet poles and having a same displacement pattern;

each magnet pole having a reference position, the reference positions being equally spaced around a circumference of the second body;

the displacement pattern of the magnet poles in the first and second groups being determined according to a formula:

$$D = \frac{2(p-1)}{N}$$

where:
D=an angular displacement in winding slot pitches of magnet pole p from its reference position,
p=a magnet pole number within the first or second group, and counted from the closest adjacent magnet pole group, and
N=the number of magnet poles in the first or second group;
at least one magnet pole in each of the first and second groups being a circumferentially outermost magnet pole and being located in its reference position as a result of said formula; and
at least one magnet pole in each of the first and second groups being a displaced magnet pole and being located in a position that is displaced from its reference position as a result of said formula by an amount that is not equal to an integral multiple of the reference angular pitch of the winding slots.

2. The electrical machine according to claim 1, wherein the first body is the stator, and wherein the second body is the rotor.

3. The electrical machine according to claim 1, wherein the first body is the rotor, and wherein the second body is the stator.

4. The electrical machine according to claim 1, wherein no magnet pole is displaced from its reference position by more than the reference angular pitch of the winding slots.

5. The electrical machine according to claim 1, wherein no two adjacent magnet poles are in contact with, or impinge upon, each other.

6. The electrical machine according to claim 1, wherein the displacement pattern of the magnet poles around the circumference of the second body has at least two-fold rotational symmetry about a rotational axis of the rotor.

7. The electrical machine according to claim 1, wherein both circumferentially outermost magnet poles in each of the first and second groups are located in their reference positions.

8. The electrical machine according to claim 1, wherein the first group includes an even number of magnet poles, and wherein the second group includes an even number of magnet poles.

9. The electrical machine according to claim 1, wherein the first group includes eight magnet poles, and wherein the second group includes eight magnet poles.

10. The electrical machine according to claim 1, wherein the winding slots are uniformly circumferentially spaced.

11. The electrical machine according to claim 1, wherein each magnet pole is substantially parallel to a rotational axis of the rotor.

12. The electrical machine according to claim 1, wherein each magnet pole is skewed relative to a rotational axis of the rotor.

13. The electrical machine according to claim 1, further comprising an air gap between the first body and the second body, and wherein an outer surface of each magnet pole is shaped such that the air gap is not uniform.

14. An electrical machine including a first body having a plurality of circumferentially spaced winding slots formed at its radially inner surface, and a second body located within the first body and having a plurality of circumferentially spaced magnet poles formed at its radially outer surface, one of the first and the second bodies being a rotatably mounted rotor, and the other of the first and the second bodies being a fixedly mounted stator, the winding slots having a reference angular pitch that is equal to 360° divided by a number of the winding slots in the electrical machine;

the magnet poles comprising at least a first group including at least two circumferentially adjacent magnet poles, and a second group including at least two circumferentially adjacent magnet poles;

each magnet pole having a reference position, the reference positions being equally spaced around a circumference of the second body;

at least one magnet pole in each of the first and second groups being a circumferentially outermost magnet pole and being located in its reference position;

at least one magnet pole in each of the first and second groups being a displaced magnet pole and being located in a position that is displaced from its reference position by an amount that is not equal to an integral multiple of the reference angular pitch of the winding slots;

the magnet poles having a reference angular pitch that is equal to 360° divided by a number of the magnet poles in the electrical machine; and winding coils having an angular pitch equal to the reference angular pitch of the magnet poles.

15. An electrical machine including a first body having a plurality of circumferentially spaced winding slots formed at its radially inner surface, and a second body located within the first body and having a plurality of circumferentially spaced magnet poles formed at its radially outer surface, one of the first and the second bodies being a rotatably mounted rotor, and the other of the first and the second bodies being a fixedly mounted stator, the winding slots having a reference angular pitch that is equal to 360° divided by a number of the winding slots in the electrical machine;

the magnet poles comprising at least a first group including at least two circumferentially adjacent magnet poles, and a second group including at least two circumferentially adjacent magnet poles;

each magnet pole having a reference position, the reference positions being equally spaced around a circumference of the second body;

at least one magnet pole in each of the first and second groups being a circumferentially outermost magnet pole and being located in its reference position;

at least one magnet pole in each of the first and second groups being a displaced magnet pole and being located in a position that is displaced from its reference position by an amount that is not equal to an integral multiple of the reference angular pitch of the winding slots;

the magnet poles having a reference angular pitch that is equal to 360° divided by a number of the magnet poles in the electrical machine; and winding coils having an angular pitch equal to two-thirds of the reference angular pitch of the magnet poles.

16. An electrical machine including a first body having a plurality of circumferentially spaced winding slots formed at its radially inner surface, and a second body located within the first body and having a plurality of circumferentially spaced magnet poles formed at its radially outer surface, one of the first and the second bodies being a rotatably mounted rotor, and the other of the first and the second bodies being a fixedly mounted stator, the winding slots having a reference angular pitch that is equal to 360° divided by a number of the winding slots in the electrical machine;

the magnet poles comprising at least a first group including at least two circumferentially adjacent magnet poles, and a second group including at least two circumferentially adjacent magnet poles;

each magnet pole having a reference position, the reference positions being equally spaced around a circumference of the second body;

at least one magnet pole in each of the first and second groups being a circumferentially outermost magnet pole and being located in its reference position;

at least one magnet pole in each of the first and second groups being a displaced magnet pole and being located in a position that is displaced from its reference position by an amount that is not equal to an integral multiple of the reference angular pitch of the winding slots; and each magnet pole being formed by permanent magnets having an angular width that is substantially $2\frac{1}{4}$ times the reference angular pitch of the winding slots.

17. An electrical machine including a first body having a plurality of circumferentially spaced winding slots formed at its radially inner surface, and a second body located within the first body and having a plurality of circumferentially spaced magnet poles formed at its radially outer surface, one of the first and the second bodies being a rotatably mounted rotor, and the other of the first and the second bodies being a fixedly mounted stator, the winding slots having a reference angular pitch that is equal to 360° divided by a number of the winding slots in the electrical machine;

the magnet poles comprising at least a first group including at least two circumferentially adjacent magnet poles, and a second group including at least two circumferentially adjacent magnet poles;

each magnet pole having a reference position, the reference positions being equally spaced around a circumference of the second body;

at least one magnet pole in each of the first and second groups being a circumferentially outermost magnet pole and being located in its reference position;

at least one magnet pole in each of the first and second groups being a displaced magnet pole and being located in a position that is displaced from its reference position by an amount that is not equal to an integral multiple of the reference angular pitch of the winding slots;

an air gap between the first body and the second body; and each winding slot at the air gap having a width substantially equal to one half of the reference angular pitch of the winding slots.

* * * * *